United States Patent [19]
Kalina

[11] Patent Number: 6,079,768
[45] Date of Patent: Jun. 27, 2000

[54] SCHOOL BUS ESCAPE DOOR SYSTEM

[76] Inventor: Benjamin F. Kalina, P.O. Box 377, Bowman, N. Dak. 58623

[21] Appl. No.: 09/283,443

[22] Filed: Apr. 1, 1999

[51] Int. Cl.⁷ ....................................................... B60J 1/00
[52] U.S. Cl. .................. 296/178; 296/146.1; 296/146.11
[58] Field of Search ............................... 296/178, 146.1, 296/146.5, 146.6, 146.8, 146.11

[56] References Cited

U.S. PATENT DOCUMENTS

| | | | |
|---|---|---|---|
| 3,861,739 | 1/1975 | Kinney | 296/146 |
| 4,216,725 | 8/1980 | Hallam | 105/348 |
| 4,414,777 | 11/1983 | Massacchia | 49/141 |
| 4,796,384 | 1/1989 | Warwick | 49/55 |
| 4,816,807 | 3/1989 | Schmitt | 340/542 |
| 4,879,842 | 11/1989 | Bailey | 49/141 |
| 5,011,215 | 4/1991 | Kalina | 296/146 |
| 5,074,611 | 12/1991 | Newkirk | 296/146 |

*Primary Examiner*—Joseph D. Pape
*Assistant Examiner*—Lori L. Coletta
*Attorney, Agent, or Firm*—Dean P. Edmundson

[57] ABSTRACT

An escape door system is described which is useful on a school bus (e.g. as a rear escape door). The system includes a hinged door which is releasably attached along one side edge to a wall of the bus. A latch which is accessible on the outside of the bus enables the door to be separated or removed from the wall of the bus in an emergency.

8 Claims, 2 Drawing Sheets

6,079,768

SCHOOL BUS ESCAPE DOOR SYSTEM

FIELD OF THE INVENTION

This invention relates to escape door systems in vehicles. More particularly, this invention relates to exit or escape doors for passenger buses such as school buses.

BACKGROUND OF THE INVENTION

School buses typically have a rear exit door. However, sometimes it is difficult to open the door to allow people to escape from the bus after an accident. This can be particularly difficult when the bus has been tipped over on its side and it is necessary to lift the weight of the rear door to open it.

My prior patent (U.S. Pat. No. 5,011,215) describes an escape door system for a bus. That system involved an aperture in the rear wall, a tab member carried by one side edge of the door that projects through the aperture, and retention means inside the bus for retaining the tab member in the aperture. By releasing the tab member, the entire rear door can be removed. However, it is necessary to release the tab member from inside the bus. This is not always possible or convenient.

There has not heretofore been provided an escape door system having the features and advantages provided by the present invention.

SUMMARY OF THE PRESENT INVENTION

In accordance with the present invention there is provided an escape door system for a passenger vehicle such as a school bus which can be easily and quickly opened after an accident to allow passengers to exit the bus. In one embodiment the escape door system comprises:

(a) an escape door having a first side edge; wherein the door normally encloses an escape opening in the rear wall of the bus;

(b) hinge means secured to the first side edge of the escape door which enables the escape door to pivot between open and closed positions;

(c) attachment means for attaching the hinge means to the exterior of the rear wall of the bus; and (d) latch means on the exterior of the rear wall of the bus which is movable between open and closed positions.

When the latch means is in the closed position, the attachment means is secured to the rear wall of the bus, and when the latch means is in the open position the attachment means is released from the rear wall. This enables the entire rear door to be removed or separated from the rear wall of the bus, thereby leaving a large opening for removing passengers from the bus in the case of an emergency.

The escape door system of the invention is easy to operate and can be opened from the exterior (or, optionally, the interior) of the bus. In one embodiment the rear windows are hinged to the rear wall of the bus so that they can be easily opened to provide additional egress area.

Other features of the escape door system of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
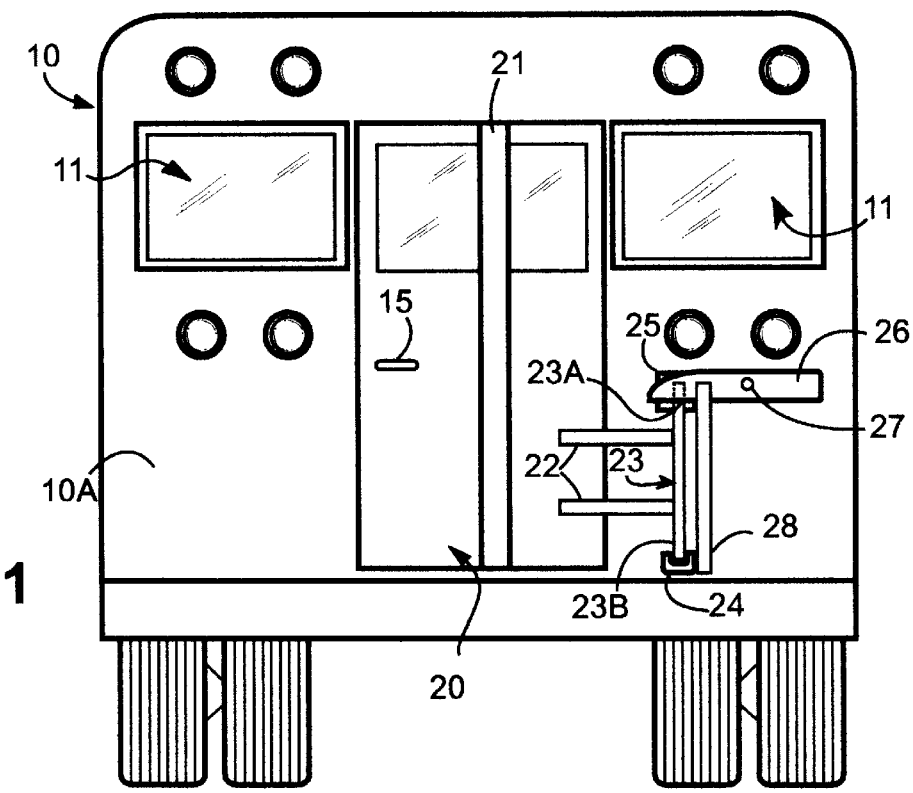
FIG. 1 is a rear elevational view of a bus employing one embodiment of escape door system of the invention.
Figure 2:
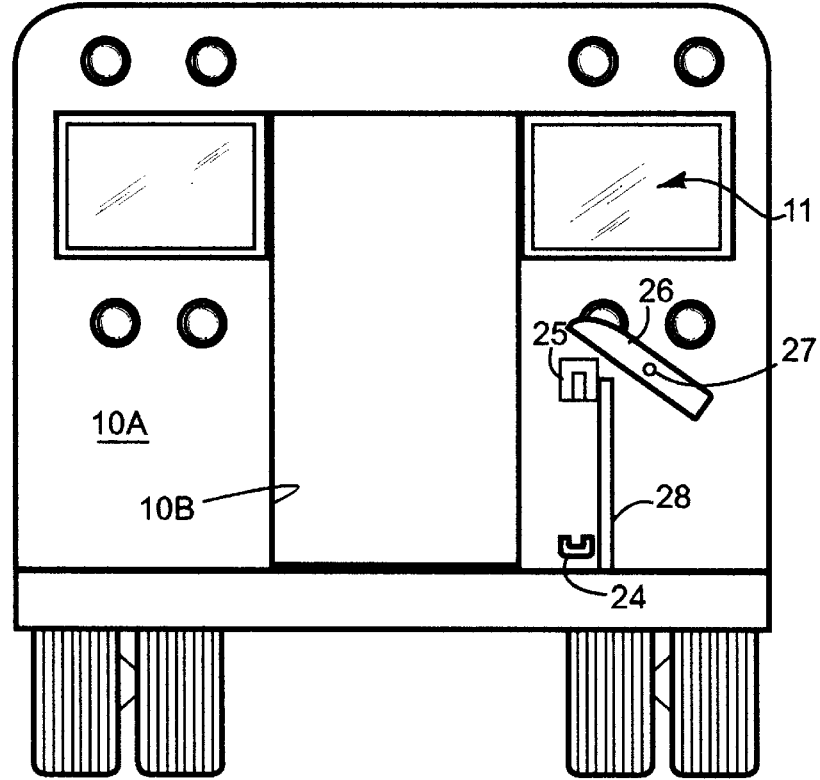
FIG. 2 is a rear elevational view of the bus of FIG. 1 with the rear door removed.

In FIGS. 1 and 2 there is shown the rear of a bus 10 having a rear wall 10A and an access opening 10B which is normally closed by rear door 20. There are also windows 11 in the rear wall.

The rear door 20 is hinged to the rear wall of the bus by means of bars 22 secured at one of their end portions to the rear door and secured at their opposite ends to vertical bar 23. The lower end 23B of bar 23 is captured or supported in a recess in bracket 24 which is secured to the rear wall 10A (e.g. with bolts). The upper end 23A of bar 23 is held against bracket 25 (which also may be secured to the rear wall by means of bolts). Vertical bar 23 and bars 22 operate together as a hinge for the rear door, enabling the door to pivot or swing outwardly from the rear wall about the longitudinal axis of vertical bar 23 when handle 15 is manipulated to unlock the door.

In an emergency, the entire rear door 20 can be easily separated or removed from the rear wall by first moving latch bar or lever 26 to a position where it no longer secures the upper end 23A of vertical bar 23 in the bracket 25. This is done by simply rotating lever 26 relative to pivot point or pin 27. Thus, by rotating lever 26 clockwise, the upper end 23A of bar 23 is released from bracket 25. The entire rear door can then be removed from the rear wall of the bus to leave an unobstructed opening for removing passengers from the bus. There may also be a lever inside the bus, mounted on the opposite end of pin 27, for operating lever 26 to release the rear door.

Preferably, the rear door 20 also includes a vertical reinforcing member 21 to protect the integrity of the door in the event of a rear end collision. Another vertical reinforcing bar 28 is positioned on the rear wall 10A adjacent to the vertical bar 23 to protect against rear end collisions.

Preferably, the edges of the rear door 20 overlap the area around the opening in the rear wall to reduce the possible of the door being jammed in the event of a collision or rollover. Soft rubber insulation is used around the rear door. Caulking may also be used around the rear door to seal against dust and air currents.

Figure 3:
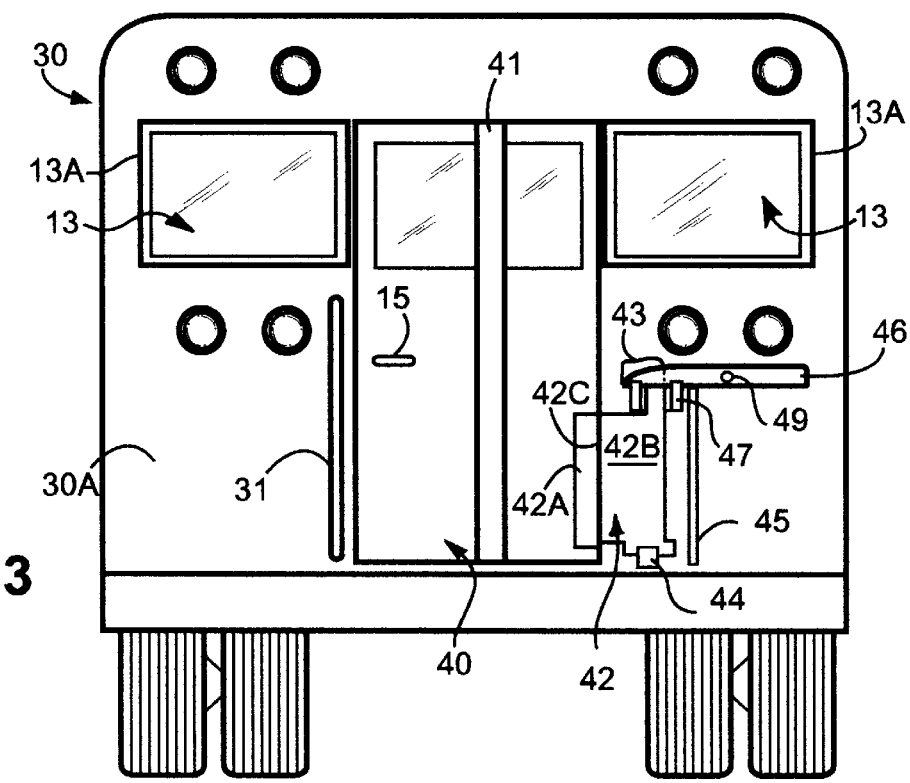
FIG. 3 is a rear elevational view of a bus showing another embodiment of the invention.
Figure 4:
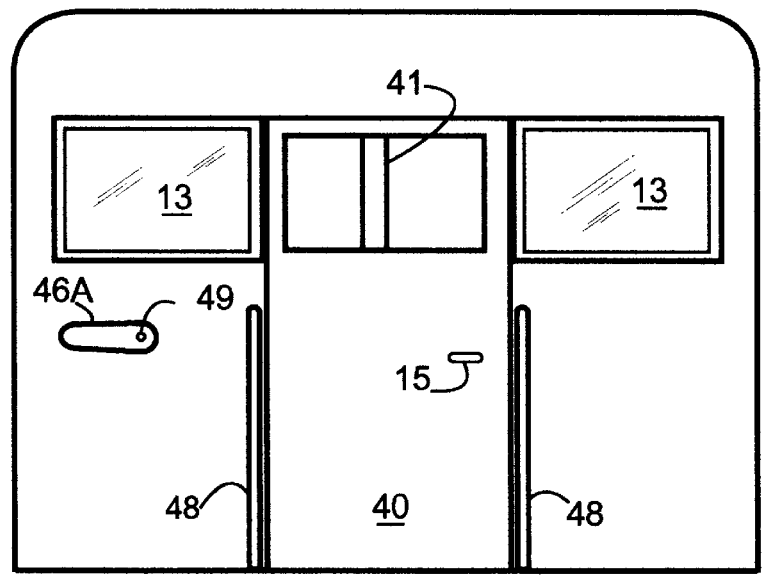
FIG. 4 shows the interior rear wall shown of the bus shown in FIG. 3.

In FIGS. 3 and 4 there is shown another embodiment of escape door 40 in the rear wall 30A of bus 30. The rear wall also includes windows 13 on opposite sides of the rear door which are hinged at their outside edge to the rear wall with hinges 13A (e.g. piano-type hinges). Caulking may be used around the periphery of the windows to keep out dust, etc. The rear door may include a vertical reinforcing member 41 to protect against rear end collisions. Additional vertical reinforcing members 31 and 45 may also be included on the rear wall on opposite sides of the door 40.

A hinge member 42 includes a portion 42A which is secured to the rear door 40 and another portion 42B which is captured or retained at its lower end in a recess in bracket 44 and is retained at its upper end 43 in bracket 47. Portion 42A can pivot relative to portion 42B along hinge line 42C.

An arm or lever 46 (rotatably mounted on pin 49 in the rear wall 30A) holds the upper end 43 of the hinge portion 42B in bracket 47 when the lever 48 is in its closed position. In this position, the rear door may be opened normally when the handle 15 is operated, and the door will pivot along vertical hinge line 42C. In the case of an emergency, lever 46 can be rotated clockwise relative to pin 49 to release the upper end 43 of hinge 42. This enables the entire rear door to separate from the rear wall of the bus to provide an unobstructed opening in the rear wall. The rear windows 13 may then also be opened (by pivoting them outwardly on hinges 13A) to enlarge the opening in the rear wall.

The windows 13 may be held in closed position by means of magnets, for example, which enable the windows to be easily opened in the event of an emergency. When the rear door 40 is closed, the door prevents the windows from being opened.

A lever 46A on the inside of the bus, mounted on the opposite end of pin 49, also enables the rear door to be released and separated from the rear wall of the bus. Additional vertical reinforcing members 48 may be located on the interior side of the rear wall of the bus. These reinforcing members may be bolted to the frame of the bus.

The brackets 24 and 25 (FIG. 1) and 44 and 47 (FIG. 3) may be bolted to the rear wall of the bus. This feature enables the escape door system to be used on any existing bus.

Other variants are possible without departing from the scope of this invention. For example, a warning alarm may be included to signal movement of the latch release lever 26 (FIG. 1) or 46 (FIG. 3).

It is also possible to include a canvas mounted at one edge to the top of the rear seat of the bus and at its opposite edge to the rear window sill. This canvas then spans the gap between the rear seat and the rear window in the event that it is necessary to crawl over the seat to exit through an open rear window.

What is claimed is:

1. In combination with a school bus having an upright wall member with an escape opening therein, wherein said wall member includes exterior and interior sides, an escape door system comprising:

(a) an escape door; wherein the door normally encloses said escape opening;

(b) hinge means secured to said escape door which enables said escape door to pivot between open and closed positions; wherein said hinge means comprises a vertical bar member; and (c) attachment means for releasably attaching said hinge means to said exterior side of said rear wall; wherein said attachment means comprises brackets secured to the exterior side of said wall member, and wherein said vertical bar member is releasably secured in said brackets; and wherein said escape door and hinge means completely detach from said wall member when said vertical bar member is released from said brackets.

2. The combination in accordance with claim 1, wherein said wall member comprises a rear wall of said bus.

3. The combination in accordance with claim 1, further comprising a lever rotatably mounted on said wall member; wherein said lever is movable between (a) a closed position wherein said vertical bar member is secured in said brackets, and (b) an open position wherein said vertical bar member is released from said brackets.

4. The combination in accordance with claim 3, wherein said lever is located on said exterior side of said wall member and is mounted on a pin extending through said wall member.

5. The combination in accordance with claim 4, further comprising an interior lever mounted on said pin on the interior side of said wall member.

6. The combination in accordance with claim 1, further comprising a vertical reinforcing member secured to said escape door.

7. The combination in accordance with claim 1, further comprising vertical reinforcing members secured to said wall member adjacent to said escape door.

8. The combination in accordance with claim 1, further comprising window members adjacent to said escape door; wherein said window members are hinged to said wall member.

\* \* \* \* \*